United States Patent
Yagi

(10) Patent No.: US 7,607,883 B2
(45) Date of Patent: Oct. 27, 2009

(54) PALLETIZING MACHINE PUSHER WITH RAISED RETURN RAIL

(76) Inventor: Sadao Yagi, 20 Mallery Rd., New Ashford, MA (US) 01237

( * ) Notice: Subject to any disclaimer, the term of this patent is extended or adjusted under 35 U.S.C. 154(b) by 264 days.

(21) Appl. No.: 11/524,119

(22) Filed: Sep. 20, 2006

(65) Prior Publication Data

US 2007/0071589 A1   Mar. 29, 2007

Related U.S. Application Data

(60) Provisional application No. 60/719,012, filed on Sep. 21, 2005.

(51) Int. Cl.
 *B65G 57/22* (2006.01)
 *B65G 17/32* (2006.01)
 *B65G 1/18* (2006.01)

(52) U.S. Cl. ............... 414/792.6; 414/790.3; 414/799; 198/385; 198/416

(58) Field of Classification Search ............ 198/419.1, 198/429, 430, 468.11, 468.9; 414/790.3, 414/792.6, 794.7, 796.8, 797.9, 798.6, 799; 53/252

See application file for complete search history.

(56) References Cited

U.S. PATENT DOCUMENTS

| | | | |
|---|---|---|---|
| 2,664,816 A * | 1/1954 | Gibson | 101/37 |
| 2,699,264 A * | 1/1955 | Bruce et. al. | 414/788.9 |
| 3,244,266 A * | 4/1966 | Zappia et al. | 198/430 |
| 3,368,660 A | 2/1968 | Standley et al. | |
| 3,823,813 A | 7/1974 | Holt | |
| 3,994,387 A * | 11/1976 | Zappia | 198/430 |
| 4,063,632 A * | 12/1977 | Neth et al. | 198/374 |
| RE30,742 E | 9/1981 | Weier | |
| 4,296,590 A | 10/1981 | Focke | |
| 4,439,084 A * | 3/1984 | Werkheiser | 414/792 |
| 4,614,473 A | 9/1986 | Kwauka et al. | |
| 4,652,198 A | 3/1987 | Geiser | |
| 4,711,612 A | 12/1987 | Kwauka | |
| 4,759,673 A * | 7/1988 | Pearce et al. | 414/789.5 |
| 4,927,133 A * | 5/1990 | Evans | 271/225 |
| 5,188,211 A * | 2/1993 | Ringot et al. | 198/411 |
| 5,312,222 A | 5/1994 | Neri et al. | |
| 5,375,967 A * | 12/1994 | Rathert | 414/789.5 |
| RE35,066 E * | 10/1995 | Martin | 414/799 |
| 5,472,077 A | 12/1995 | Bolin | |
| 5,522,692 A * | 6/1996 | Simkowski | 414/789.5 |
| 5,704,292 A | 1/1998 | Rebeaud | |
| 5,733,100 A | 3/1998 | Slat et al. | |
| 5,758,471 A * | 6/1998 | Denley et al. | 53/399 |
| 5,844,807 A * | 12/1998 | Anderson et al. | 700/217 |

(Continued)

*Primary Examiner*—Gregory W Adams
(74) *Attorney, Agent, or Firm*—Malcom J. Chisholm, Jr.

(57) ABSTRACT

An improved palletizing machine (10) includes a frame (12), a pallet plate (16) for supporting pallets (18), and a pallet raising and lowering mechanism (20). A pusher bar assembly (26) includes at least one raised return rail (44) to facilitate return of a pusher bar (28) to a start position (68). An extendable object positioning wheel (104) on a conveyor (119) feeding objects (24) to an object receiver (22) of the machine (10) facilitates pivoting of objects (24) between positions as the objects (24) impact the wheel (104). A stripper sheet positioning assembly (80) positions and removes a stripper sheet (82) from on top of the pallet (18) or layer (118) of objects (24) to prevent pushed objects (24) from catching upon edges of objects (24) in a layer (116) already on the pallet.

8 Claims, 12 Drawing Sheets

U.S. PATENT DOCUMENTS 6,568,524 B1 * 5/2003 Cornell et al. .............. 198/416
6,935,484 B2 * 8/2005 Davis et al. ................. 198/416
2004/0069596 A1 * 4/2004 Davis et al. ................. 198/403

* cited by examiner

PALLETIZING MACHINE PUSHER WITH RAISED RETURN RAIL

CROSS REFERENCE TO RELATED APPLICATION

This Application claims the benefit of U.S. Provisional Patent Application Ser. No. 60/719,012 that was filed on Sep. 21, 2005, entitled "Improved Palletizing Machine".

TECHNICAL FIELD

The present invention relates to machines that position layers of box-like objects upon pallets for transport of the objects upon the pallets.

BACKGROUND ART

Palletizing machines are well known for automated placement of boxes in layers upon pallets for movement of the boxes from manufacturing plants to distribution and sales locations. Typically an automatic box feeder, such as a belt conveyor or gravity roller apparatus will feed a sequence of boxes into a palletizing machine, and the machine will then position rows of boxes into layers, and then position additional boxes into more layers stacked upon each other. The pallet with the stacked layers of boxes will then be moved by a fork truck to a storage or transport location, as is well known.

Efforts persist to improve palletizing machines to thereby minimize the cost of materials and manufacture for such machines, and to minimize labor costs to build and operate such machines. For example, in U.S. Pat. No. 4,614,473 to Kwauka et al., a palletizing machine is disclosed that includes a pusher bar for pushing rectangular objects, such as books or boxes, onto a pallet. The pusher bar is retracted from a position over the pallet back to a start position by complex piston cylinder units that raise the pusher or sweep bar over incoming books that are next pushed by the sweep bar. Similarly, in U.S. Pat. No. 4,711,612 to Kwauka, a retracting pusher bar is raised during retraction by a complex piston assembly. In U.S. Pat. No. 5,733,100 that issued to Slat et al., a pusher bar of a palletizing machine for cylindrical objects is disclosed as being raised during re-positioning by a cylindrical piston. In U.S. Pat. No. 5,472,077 to Bolin, shows retraction of a pusher arm in a raised position through use of a controller and electric motors. These Patents also disclose many complicated and unique components of each machine that are necessary for the palletizing machines to operate efficiently.

As is apparent, use of hydraulic cylinder and piston apparatus or electric motor assemblies are common in such extraordinarily complex palletizing machines. Many of the known palletizing machines are specifically designed only for limited sized of objects being palletized. While such complex machines serve to minimize labor costs, they are nonetheless very costly to manufacture and operate. Accordingly, there is a need for a palletizing machine that minimizes cost of manufacture and operation.

(Most palletizing machines position "boxes" upon pallets, meaning rectangular, cardboard objects that contain an article of manufacture. However, in some instances, palletizing machines may also position articles of manufacture that are not contained within "boxes". Therefore, for purposes herein, it is to be understood that the word "object" or "objects" is to mean both a rectangular box or boxes, and any other articles of manufacture that are to be positioned upon a pallet.)

SUMMARY OF THE INVENTION

The invention is a palletizing machine for positioning objects onto a pallet. The palletizing machine includes a frame having a pallet plate secured between posts of the frame for supporting the pallet. The frame includes a pallet raising and lowering device for selectively raising and lowering the pallet plate within the frame. An object receiver is secured to the frame for receiving objects from an automatic object feeder.

A pusher bar assembly is secured to the frame adjacent the object receiver, and the pusher bar assembly includes: a pusher bar for pushing objects from the object receiver onto the pallet supported by the pallet plate; a first pusher strut secured between a first end of the pusher bar and a pusher bar drive means secured to the frame for moving the pusher bar from adjacent the object receiver over the pallet plate and back to adjacent the object receiver, and a second pusher strut secured between a second end of the pusher bar and the pusher bar drive means. The pusher bar assembly also includes at least one raised return rail secured to the frame adjacent the object receiver and positioned so that the pusher bar passes under the raised return rail as the pusher drive means moves the pusher bar and objects contacting the pusher bar from adjacent the object receiver over the pallet plate. The raised return rail is also positioned so that the pusher bar passes along the raised return rail as the pusher drive means moves the pusher bar from over the pallet plate back to adjacent the object receiver. The raised return rail includes an override segment upon which the pusher bar passes. An override segment distance defined between the override segment and the object receiver is sufficient to permit the pusher bar to pass over the objects upon the object receiver as the pusher bar is returned by the pusher drive means to adjacent the object receiver. The pusher bar assembly therefore permits the pusher bar to be retracted up and over a new row of objects being received on the object receiver without the use of complicated cylinder and/or electric motor assemblies.

In an alternative embodiment, the object receiver of the palletizing machine also includes an object transfer segment and an adjacent pallet feed segment. The pusher bar is adjacent the pallet feed segment for pushing objects from the pallet feed segment onto the pallet as described above. An object positioning wheel is secured between rollers of the object receiver within the object transfer segment. The positioning wheel is positioned on either side of a roller mid-line defined to run parallel to an axis of travel of the objects upon the object transfer segment of the object receiver and midway between opposed sides of the object transfer segment of the object receiver. The object positioning wheel includes a positioning wheel raising and lowering device to selectively raise the wheel above a plane defined by top surfaces of the rollers so that the wheel contacts a first off-center side of an object traveling along the object receiver to interrupt travel of the side of the object contacting the object positioning wheel. Simultaneously, an opposed second off-center side of the object continues along the rollers of the object transfer segment to pivot the object from a first position into a second position. The positioning wheel raising and lowering device may selectively return the positioning wheel to a position below the plane defined by the top surfaces of the rollers to thereby stop pivoting the objects as they move across the object transfer segment of the object receiver.

This clever device thereby permits the palletizing machine to alternate alignment of, for example, rectangular box-shaped objects so that layers or portions of layers of the boxes positioned upon the pallet may be in alternate, interlocking alignments to facilitate securing stacks of the layers upon the pallets from tumbling off of the pallet. The object transfer segment of the object receiver may also include adjustable object guide rails adjacent and extending above sides of the segment to guide objects as they pass along the object transfer segment toward the object positioning wheel. While it is well known to arrange objects in such alternate, interlocking alignments, use of the object positioning wheel accomplishes the task with extraordinary efficiency.

In a further embodiment, the improved palletizing machine includes a stripper sheet positioning assembly for selectively passing a stripper sheet parallel to a plane defined by the pallet adjacent the object receiver for facilitating sliding of objects over the pallet plate. The stripper sheet positioning assembly includes a first pair of receiving sleeves secured on opposed posts of the frame; a first dead weight extending between the first pair of receiving sleeves; a second pair of receiving sleeves secured on opposed posts of the frame; and a second dead weight extending between the second pair of receiving sleeves. A stripper sheet drive axle extends between the first pair of receiving sleeves adjacent the object receiver, and the stripper sheet is secured between the first and second dead weights. A stripper sheet drive mechanism is secured to the stripper sheet drive axle and selectively positions the stripper sheet between a first position parallel to a plane defined by the pallet plate and a second position between the first pair of receiving sleeves.

The stripper sheet drive mechanism positions the stripper sheet on top of a layer of boxes that has been positioned on the pallet plate while a next layer of boxes is positioned on top of the stripper sheet. When all of the objects of the layer of boxes are completely positioned on the stripper sheet, the stripper sheet is removed by the stripper sheet drive mechanism, and the pallet raising and lowering device lowers the pallet down a distance of one layer. Then the stripper sheet is replaced over the pallet plate on top of the layer of objects that was just positioned by the palletizing machine. By use of the stripper sheet positioning assembly, the palletizing machine minimizes any possibility of the objects being pushed by the pusher bar becoming caught and/or stuck upon objects in a lower layer. The improved palletizing machine therefore substantially enhances palletizing of objects through use of the raised return rail, the object positioning wheel, and the stripper sheet positioning assembly.

Accordingly, it is a general purpose of the present invention to provide an improved palletizing machine that overcomes deficiencies of the prior art.

It is a more specific purpose to provide an improved palletizing machine that minimizes manufacturing and operating costs.

These and other purposes and advantages of the present improved palletizing machine will become more readily apparent when the following description is read in conjunction with the accompanying drawing.

DESCRIPTION OF THE PREFERRED EMBODIMENTS

Figure 1:
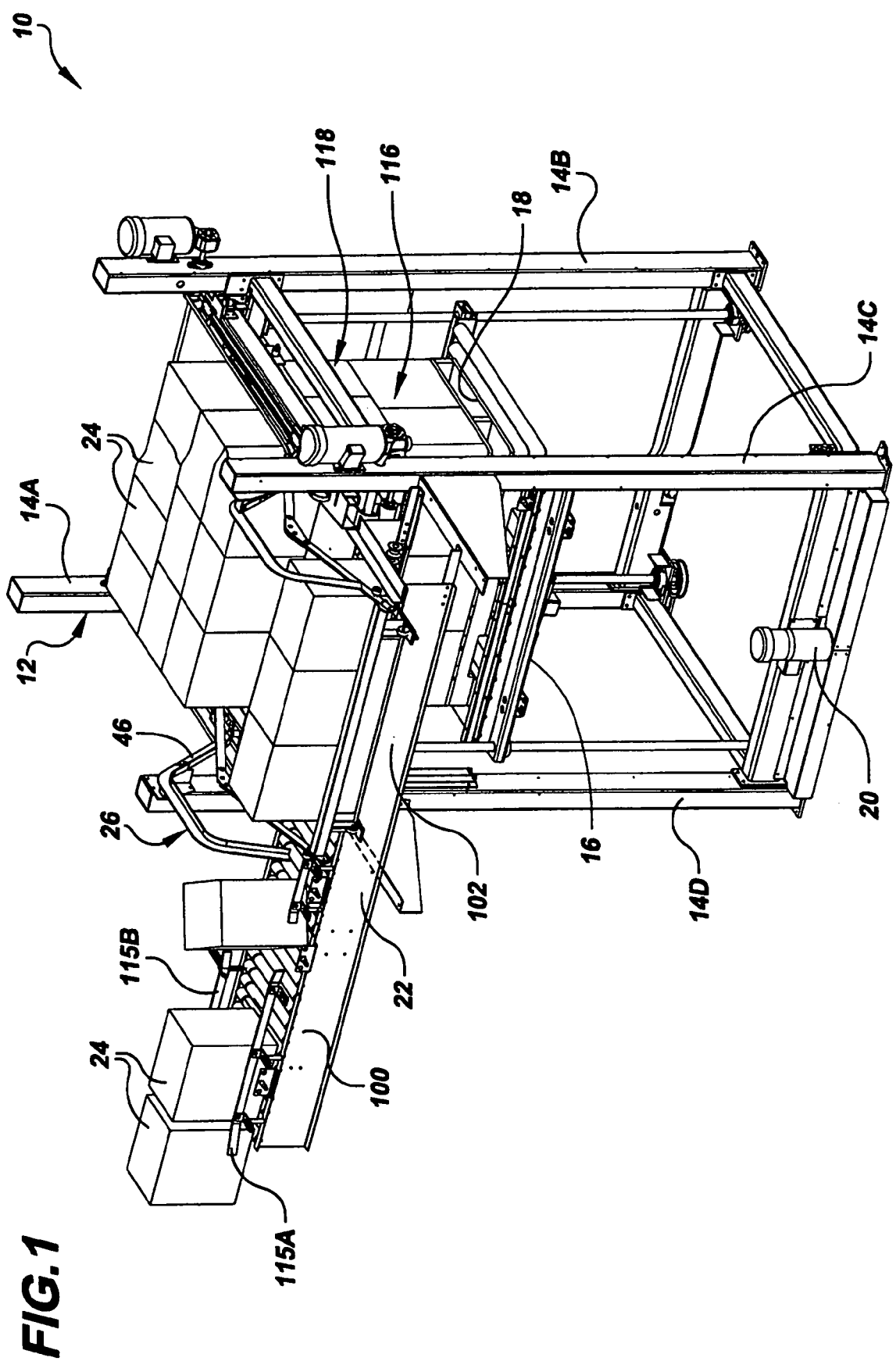
FIG. 1 is a raised, front perspective view of an improved palletizing machine constructed in accordance with the present invention.

Referring to the drawings in detail, an improved palletizing machine is shown in FIG. 1, and is generally designated by the reference numeral 10. The palletizing machine 10 includes a frame 12 having a plurality of posts 14A, 14B, 14C, 14D that support a pallet plate 16 dimensioned to hold a pallet 18. Secured to the frame is a pallet raising and lowering means for selectively raising and lowering the pallet plate 16, such as a pallet raising and lowering motor, axle, carriage screw drive 20, or any other mechanical apparatus capable of selectively raising and lowering the pallet plate 16 within the frame 12, such as hydraulic apparatus, etc. (For purposes herein, the word "selectively" is to mean that a described function may be initiated or terminated at times or intervals selected by an operator or controller, etc.) The palletizing machine 10 also includes an object receiver 22 secured to the frame 12 for receiving objects 24 (such as boxes) that are to be positioned by the palletizing machine 10 upon the pallet 18.

Figure 3:
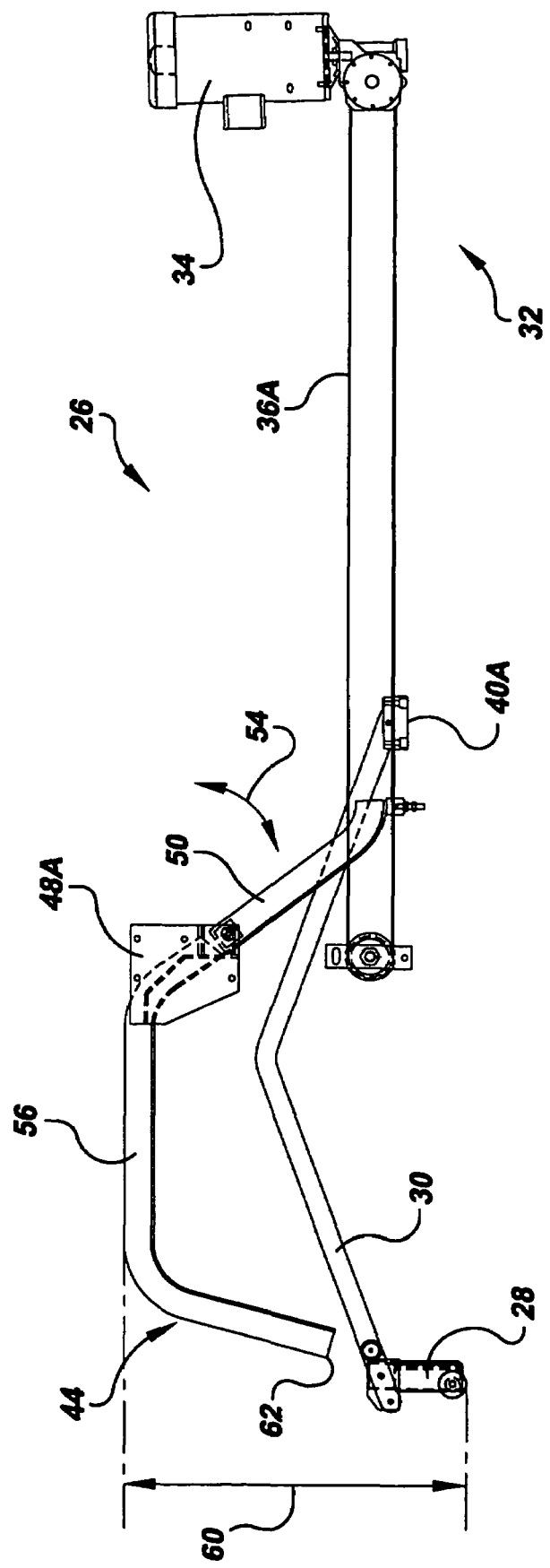
FIG. 3 is a side plan view of a pusher bar assembly of the improved palletizing machine.
Figure 4:
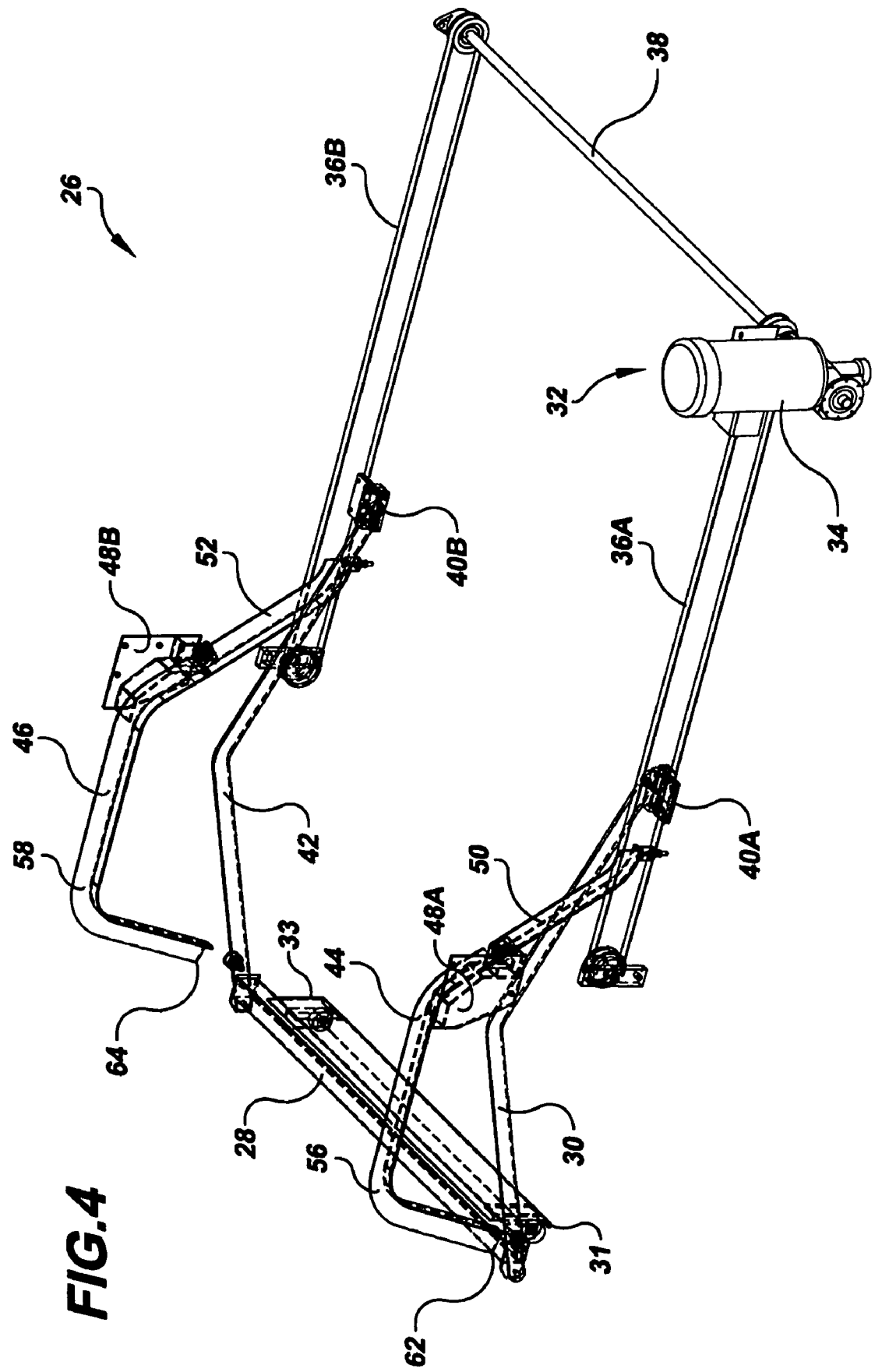
FIG. 4 is a raised perspective view of the FIG. 3 pusher bar assembly of the improved palletizing machine.

A pusher bar assembly 26 (shown best in FIGS. 3 and 4) is secured to the frame 12 adjacent the object receiver 22, and includes a pusher bar 28 for pushing the objects 24 from the object receiver 22 onto the pallet 18. A first pusher strut 30 is secured between a first end 31 of the pusher bar 28 and a pusher bar drive means 32 for moving the pusher bar 28 from adjacent the object receiver 22 over the pallet plate 16 and back adjacent the object receiver 22. The pusher bar drive means 32 may include a pusher motor 34, first and second endless belts or chains 36A, 36B interconnected by a pusher drive axle 38 and associated pulleys and securing clips 40A, 40B for securing the pusher bar 28 to the first pusher strut 30 and a second pusher strut 42. The second pusher strut 42 is secured between the opposed second end 33 of the pusher bar 28 and one of the securing clips 40B of the pusher bar drive means 32, as shown best in FIG. 4. In certain embodiments, it may be practical and efficient to secure the pusher bar 28 somewhat rigidly to one of the pusher struts 30, 42 so that only one pusher strut 30, 42 is necessary, and hence the pusher bar drive means 32 would likewise be modified to only operate one of the struts 30, 42. The pusher bar drive means 32 may be any other known drive mechanism capable of moving the pusher bar struts 30, 42 as described herein.

The pusher bar assembly 26 also includes a first raised return rail 44 and a second raised return rail 46 secured to the frame 12, such as at frame posts 14C, 14D by brackets 48A, 48B. The raised return rails 44, 46 include a one-way strut guide means for guiding the pusher struts 30, 42 to ride along the rails 44, 46 as the struts 30, 42 move in only one direction, namely in the direction back toward the object receiver 22. The one-way strut guide means may be any known mechanism that can achieve the function, including electro-mechanical, hydraulic, magnetic switches, etc., or for example first and second return rail pivot arms 50, 52 that pivot in a direction indicated by pivot arrow 54 shown in FIG. 3. As the first pusher bar strut 30 passes under the first return rail pivot arm 50, the pivot arm moves upward, away from the first strut 30 so that the strut 30 passes under the pivot arm 50. However, as the first strut 30 returns back toward the object receiver 22, the first strut 30 and/or its affixed pusher bar 28 slide onto the first pivot arm 50 because the directional force of the first strut 30 causes the first pivot arm 50 to not pivot upward.

The first raised return rail 44 includes a first override segment 56 and the second raised return rail 46 includes a second override segment 58 over which the pusher bar 28 passes. An override segment distance 60 defined between the first or second override segments 56, 58 and the object receiver 22 is sufficient to permit the pusher bar 28 to pass over the objects 24 upon the object receiver 22 as the pusher bar is returned by the pusher bar drive means 32 over the pallet plate 16 and beyond the raised return rails 44, 46 back to adjacent the object receiver 22.

Figure 2:
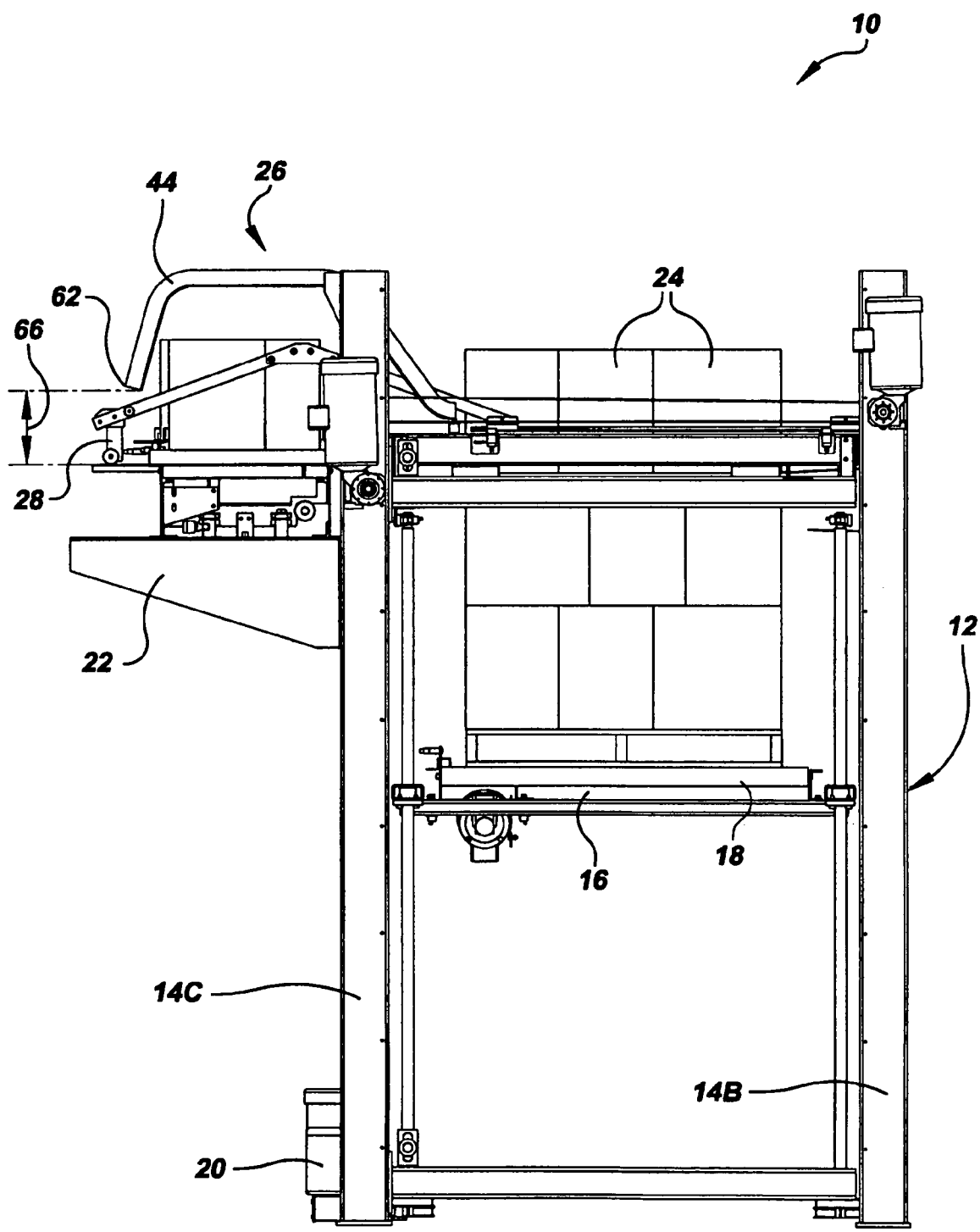
FIG. 2 is side plan view of the FIG. 1 improved palletizing machine.

In a preferred embodiment, the first raised return rail 44 includes a first raised return rail entry 62 positioned over the object receiver 22, and the second raised return rail 46 includes a second return rail entry 64 positioned over the object receiver 22. An entry distance 66 between the first or second raised return rail entries 62, 64 and the object receiver 22 is sufficient to permit the pusher bar 28 to move along the object receiver 22 under the entries 62, 64 and unimpeded by the entries 62, 64, as best shown in FIG. 2.

Figure 5:
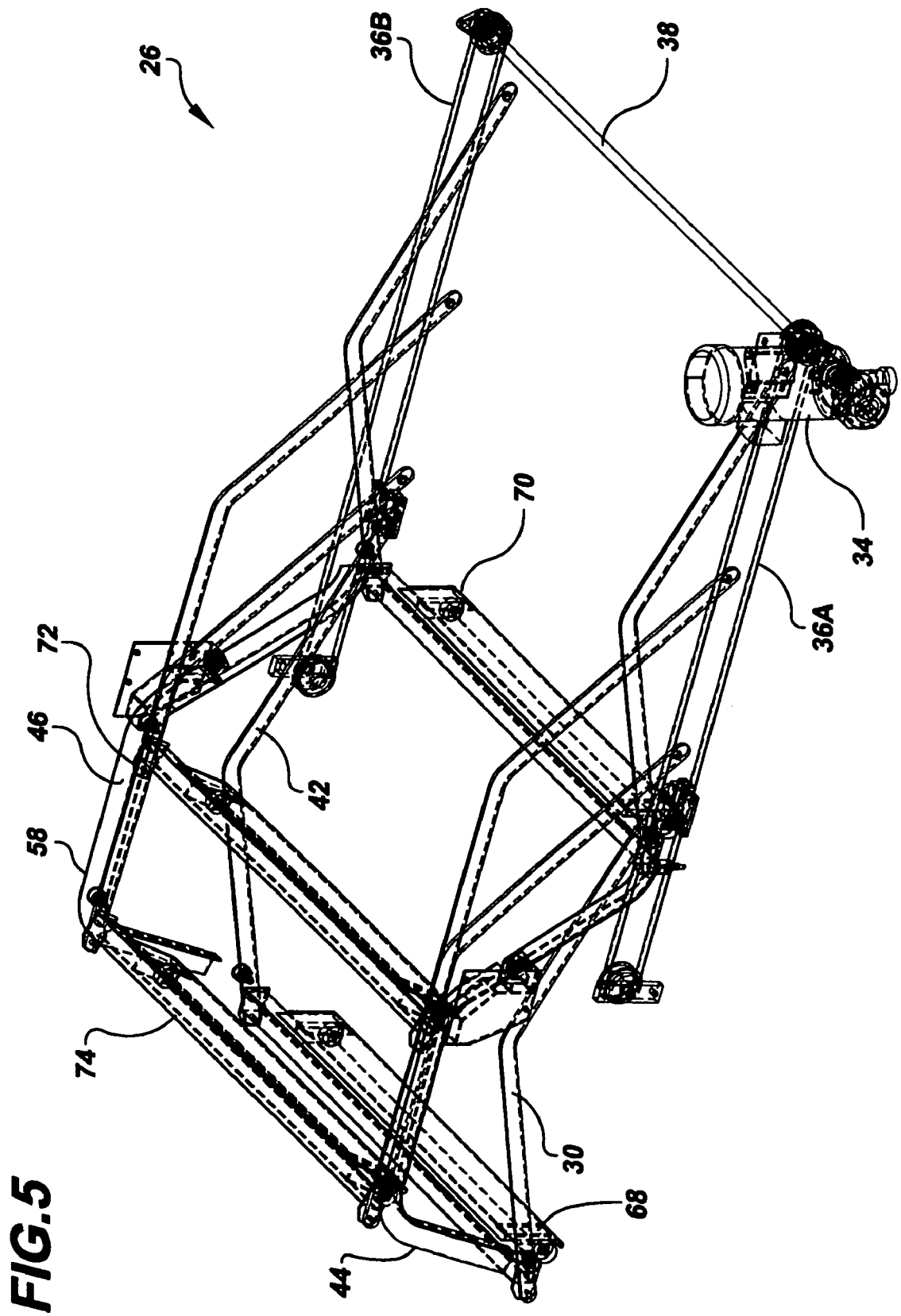
FIG. 5 is a raised perspective view of the FIG. 4 pusher bar assembly of the improved palletizing machine showing the pusher bar in several positions.

To clarify operation of the pusher bar assembly 26, FIG. 5 shows the pusher bar 28 moving from a start position 68 to an extended position 70 wherein any objects 24 pushed by the pusher bar 28 would be over the pallet plate 26. The pusher bar 28 is also shown in a first override position 72 and a second override position 74 upon the override segments 56, 58 of the first and second raised return rails 44, 46. It is apparent that operation of the pusher bar assembly 26 provides for an extremely efficient retraction of the pusher bar 28 without any complicated hydraulic cylinder or mechanical screw operation, while also providing for uninterrupted movement of the objects 24 onto the object receiver 22.

Figure 10:
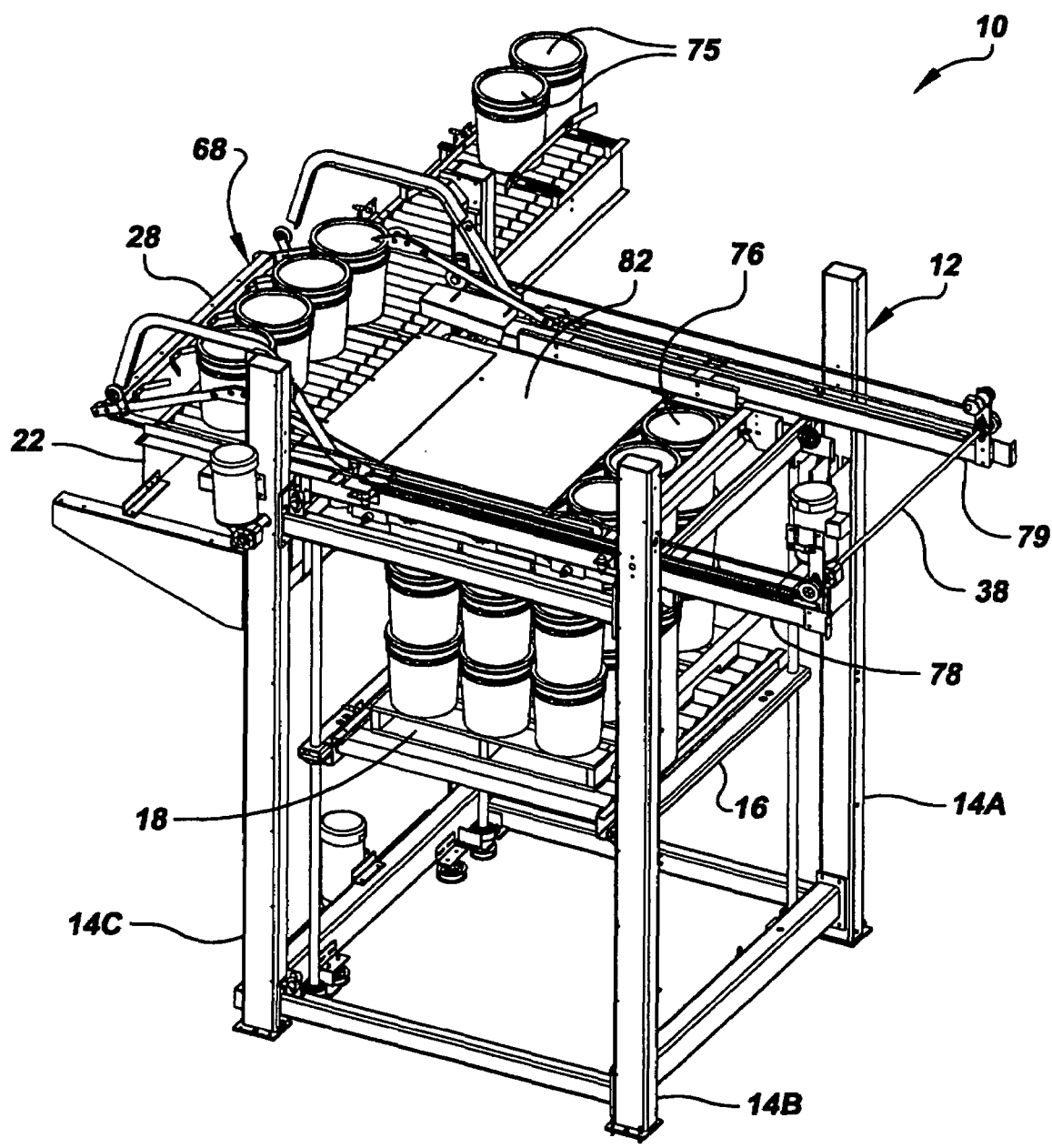
FIG. 10 is a raised perspective view of the improved palletizing machine of the present invention showing pail-shaped objects on the machine.
Figure 11:
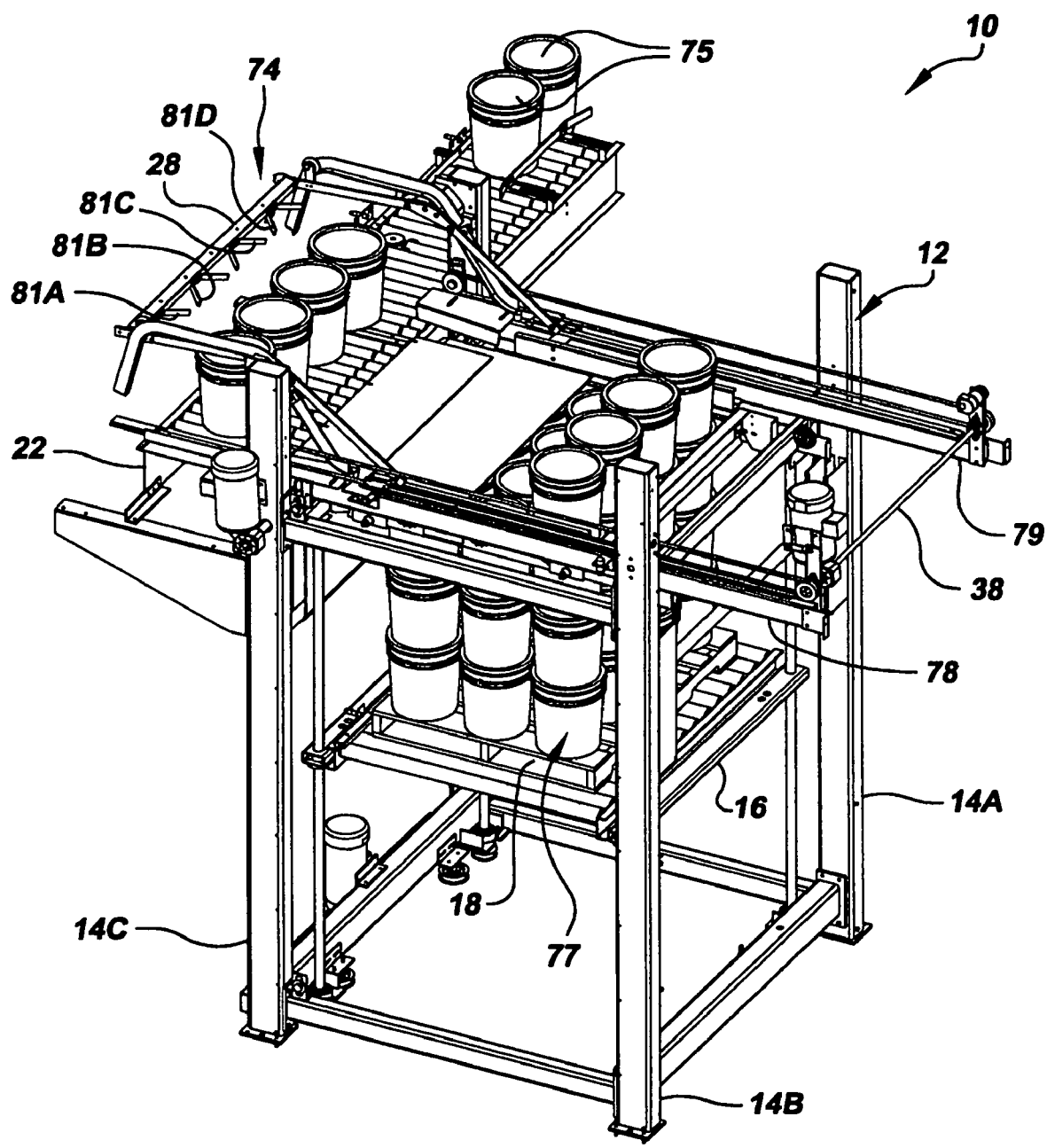
FIG. 11 is a raised perspective view of the FIG. 10 improved palletizing machine showing a four pails of a new layer of pails positioned on a pallet.
Figure 12:
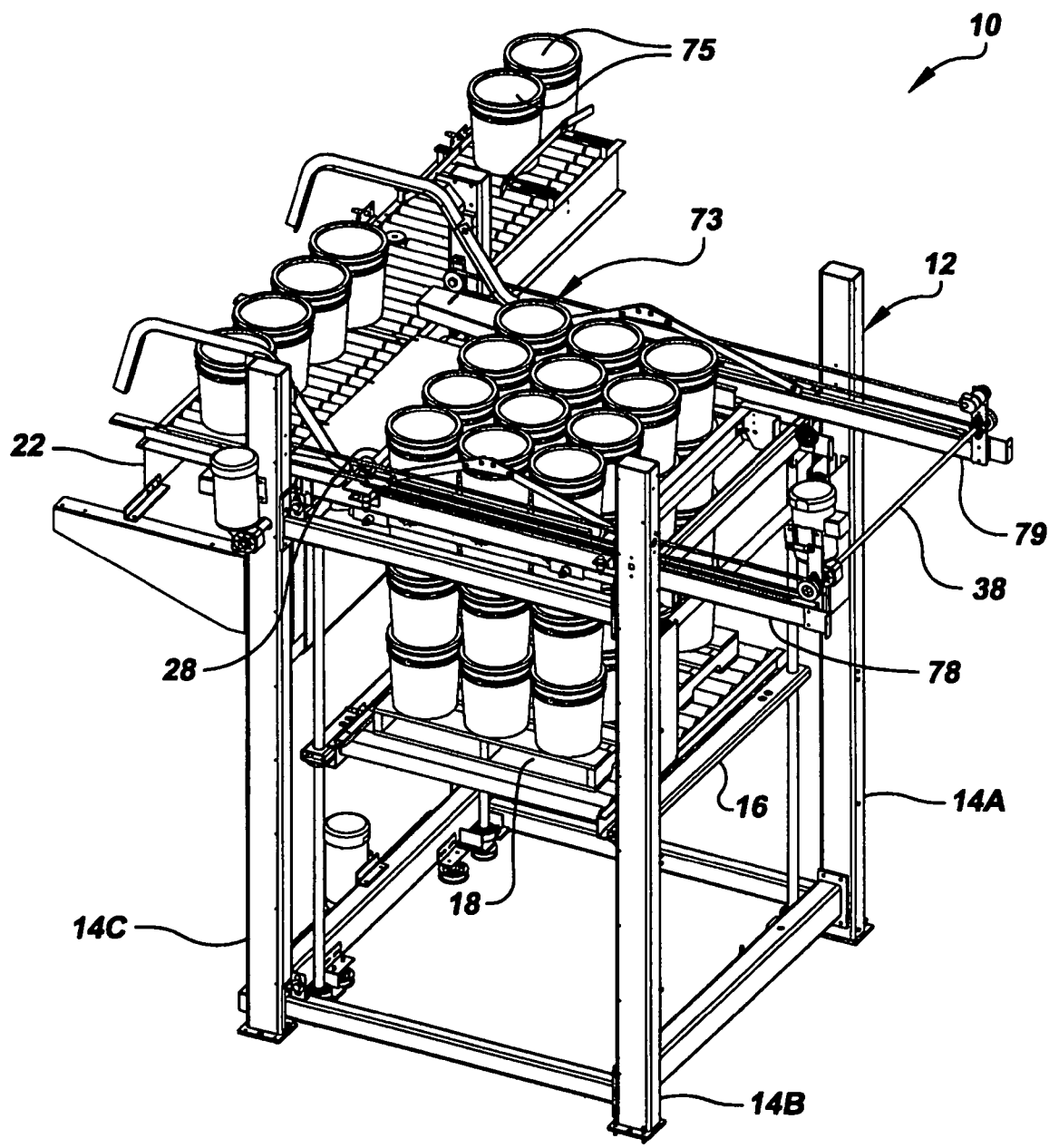
FIG. 12 is a raised perspective view of the FIG. 10 improved palletizing machine showing a complete new layer of pails positioned by the machine.

A further demonstration of operation of the pusher bar 28 and pusher bar drive means is shown in the sequence in FIGS. 10-12, wherein placement of pail-shaped objects 75 on the pallet 18 is shown. In FIG. 10, four pail-shaped objects 75 are shown on the object receiver 22 and the pusher bar 28 is shown in the start position 68 adjacent the four pail-shaped objects 75. In FIG. 11 the pusher bar 28 is shown in the second override position 74, after having moved the four pail-shaped objects shown in FIG. 10 over a stripper sheet 82, and unto a lower layer 76 of pail-shaped objects 75.

For moving such irregular or pail-shaped objects 75 onto the lower layer 76 of the objects 75, it may be necessary for the pusher bar drive means 32 to drive the pusher bar to specific positions over the lower layer 76. For example, as shown in FIG. 11 the pusher bar 28 would have to extend the four pail-shaped objects as far as a row 77 of the lower layer 76 that is a farthest row from the object receiver 22. To extend the pusher bar 28 that far from the object receiver 22, the pusher drive means 32 may include a first frame extension 78 and a second frame extension 79 to which the pusher drive axle 38 is secured, again as shown in FIG. 10-12. The first and second frame extensions 78, 79 may extend from frame post 14A, 14B. In FIG. 12 the pusher bar 28 is shown in the extended position 70 (shown in FIG. 5) to complete movement of the pail-shaped objects 75 onto the pallet 18 forming a top layer 73 of the pail-shaped objects 75. As shown in FIG. 11, for irregularly shaped objects 24 such as, pail-shaped objects 75, the pusher bar 28 may include one or more object guides 81A, 81B, 81C, 81D.

Figure 6:
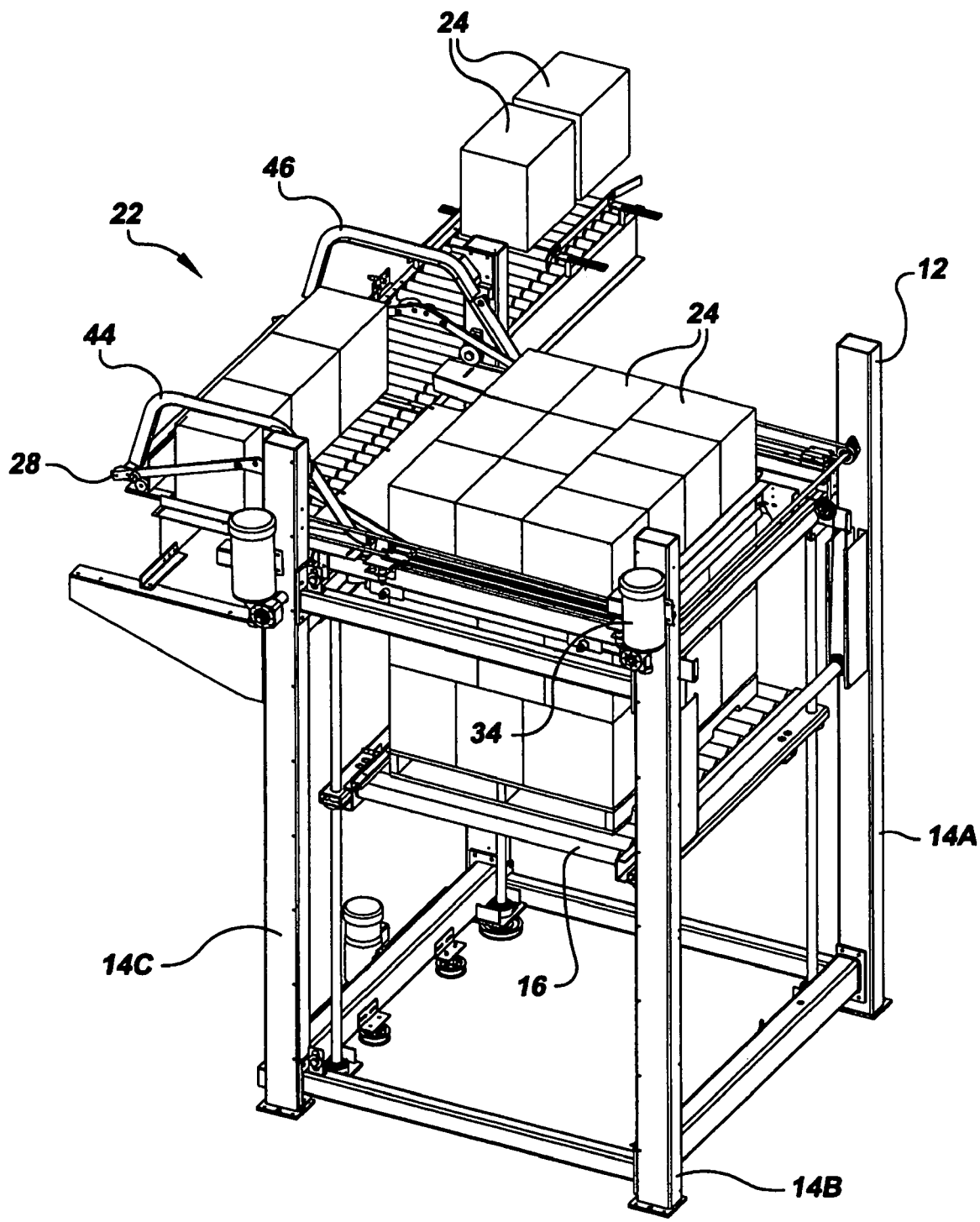
FIG. 6 is a raised, side perspective view or the improved palletizing machine of the present invention.
Figure 7:
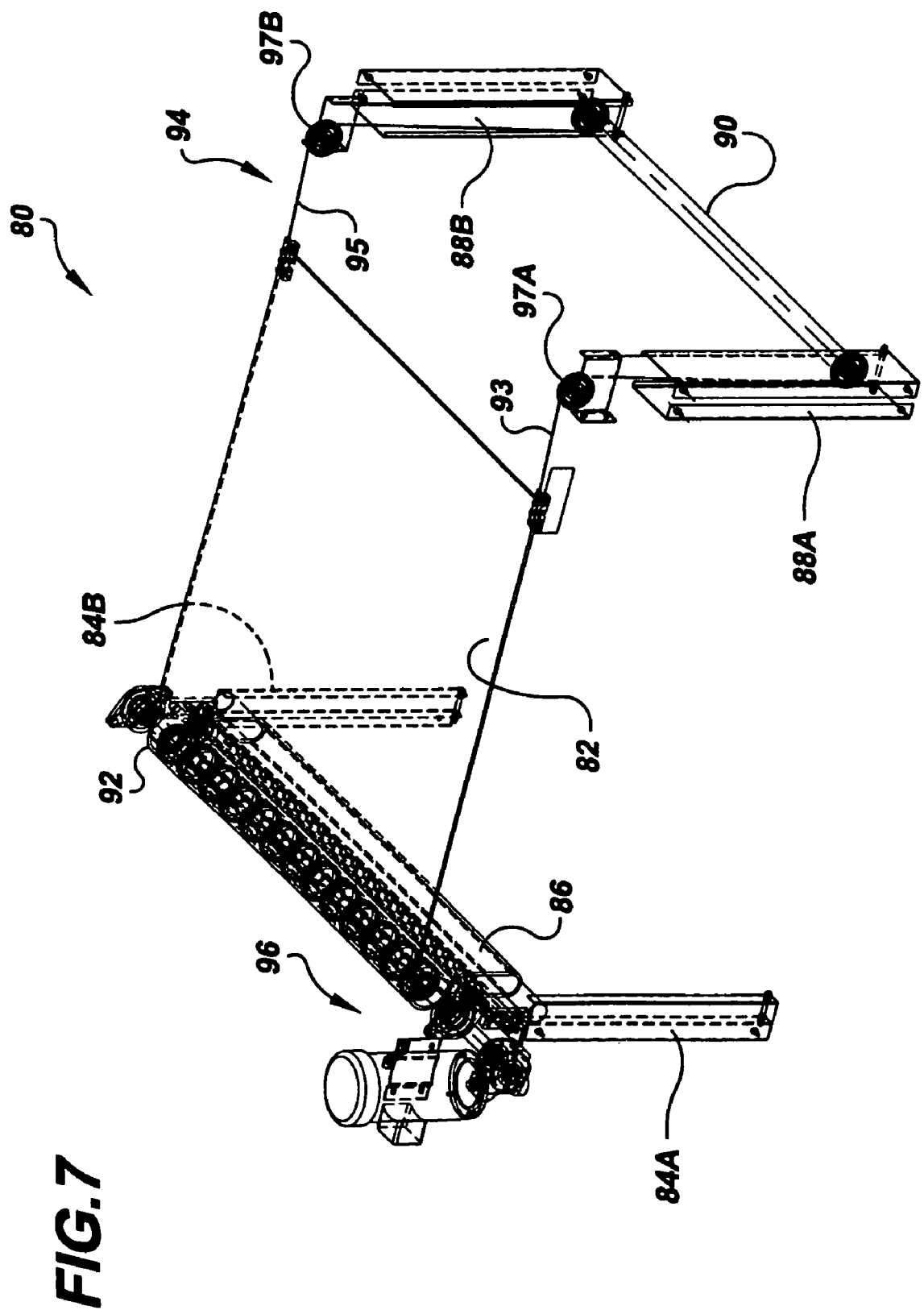
FIG. 7 is a raised perspective view of a stripper sheet positioning assembly of the improved palletizing machine.

FIGS. 6 and 7 show an embodiment of the improved palletizing machine 10 that includes a stripper sheet positioning assembly means 80 (best seen in FIG. 7) for selectively passing the stripper sheet 82 between a first position parallel to a plane defined by a top surface of the pallet 18 and adjacent the object receiver 22 and a second position away from the first position, such as between posts 14C, 14D of the frame 12. This facilitates a sliding movement of the objects 24 from the object receiver 22 onto the pallet 18 without catching upon previously positioned objects 24 already on the pallet 18 in a layer 118 below the object receiver 22. The preferred stripper sheet positioning assembly means 80 includes a first pair of receiving sleeves 84A, 84B (shown best in FIG. 7) secured between opposed posts 14C, 14D of the frame 12 and adjacent the object receiver 22. A first dead weight 86 is suspended between the first pair of receiving sleeves 84A, 84B. A second pair of receiving sleeves 88A, 88B is secured between different opposed posts 14A, 14B of the frame 12, and a second dead weight 90 extends between the second pair of receiving sleeves 88A, 88B. A stripper sheet drive axle 92 is secured to extend between the first frame posts 14C, 14D adjacent the first pair of receiving sleeves 84A, 84B, and the stripper sheet 82 is secured between the first dead weight 86 and second dead weight 90 over the stripper sheet drive axle 92 by stripper sheet securing means 94 for facilitating movement of the stripper sheet 82. The stripper sheet securing means 94 may include lines 93, 95, pulley wheels 97A, 97B, etc., known in the art for securing the stripper sheet 82 to the dead weights 86, 90 and for facilitating movement of the stripper sheet 92 as described herein.

A stripper sheet drive motor means 96 is secured in mechanical communication with the stripper sheet drive axle 92 for selectively positioning the stripper sheet 82 in a first position parallel to a plane defined by an upper surface of the pallet 18 (as shown in FIG. 7) and a second position away from the first position, such as between the first pair of receiving sleeves 84A, 84B. As described above, a user (not shown) controls the stripper sheet positioning assembly means 80 to position the stripper sheet 82 in the first position while the pusher bar 28 moves the objects onto the pallet 18 on top of the stripper sheet 82, as shown in FIG. 1. Whenever the predetermined number of objects 24 is positioned to establish a complete layer 118, the stripper sheet drive means 96 moves the stripper sheet 82 away from the first position under the layer of objects 24 and the pallet raising and lowering means 20 lowers the pallet 18 a distance of about the height of the layer 118 of objects 24, and then the stripper sheet drive means 96 re-positions the stripper sheet 82 back in the first position on top of the layer 118 of objects 24. In this manner, any possibility of the objects 24 that are being pushed by the pusher bar 24 onto the pallet 18 being caught or stuck upon edges of the layer of objects 24 under the stripper sheet 82 is minimized.

Figure 8:
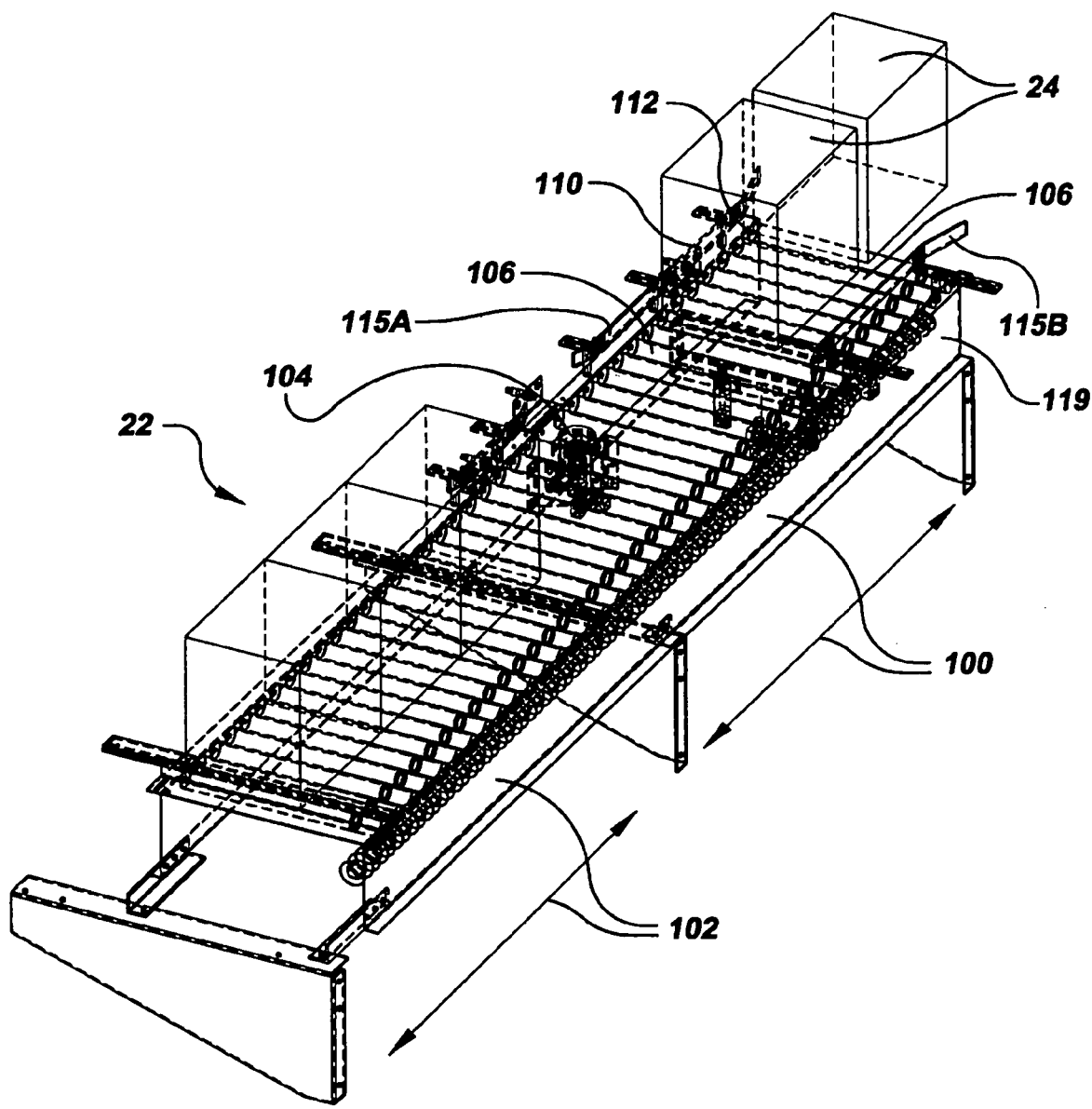
FIG. 8 is a raised perspective view of an object receiver of the improved palletizing machine showing an object transfer segment and a pallet feed segment of the object receiver.
Figure 9:
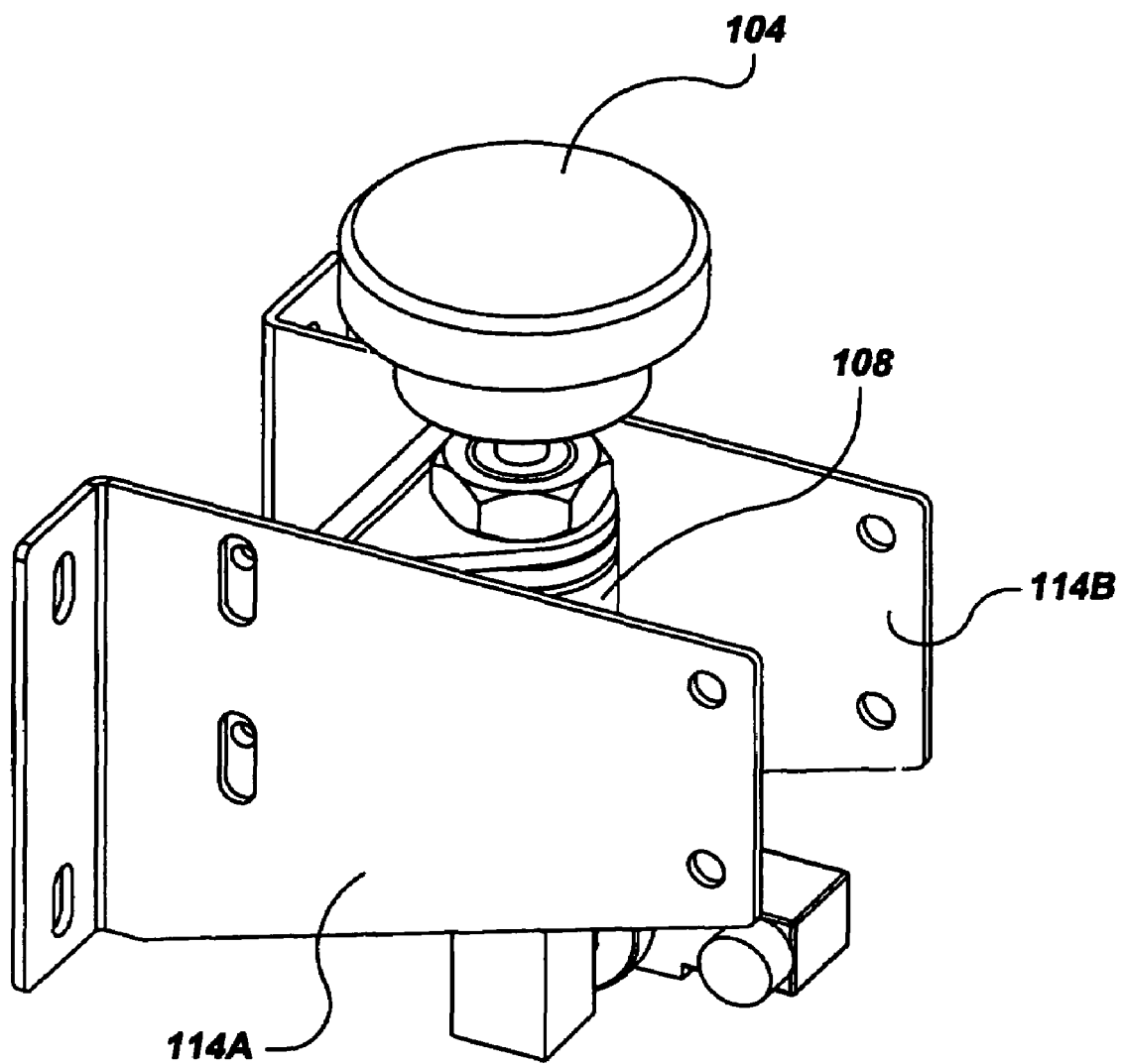
FIG. 9 is a raised perspective view of an object positioning wheel of the improved palletizing machine of the present invention.

In yet another embodiment of the improved palletizing machine 10 and as best shown in FIG. 8, the object receiver 22 includes an object transfer segment 100 and a pallet feed segment 102 adjacent the pusher bar 28. The pusher bar 28 is adjacent the pallet receiver segment 102 of the object receiver 22 for pushing objects 24 off of the object receiver 22 and onto the pallet 18.

An object positioning wheel 104 is secured between rollers 106 of the object receiver 22 within the object transfer segment 100. The positioning wheel 104 is positioned on either side of a roller mid-line defined to run parallel to an axis of travel of the objects upon the object transfer segment 100 of the object receiver 22 and mid-way between opposed sides of the object transfer segment 100 of the object receiver 22. The object positioning wheel 106 includes a positioning wheel raising and lowering means 108 to selectively raise the wheel 104 above a plane defined by top surfaces of the rollers 106 so that the wheel contacts a first off-center side 110 of an object 24 traveling along the object receiver 22 to interrupt travel of that first off-center side 110 of the object 24 contacting the object positioning wheel 104. Simultaneously, an opposed second off-center side 112 of the object 24 continues along the rollers 106 of the object transfer segment 100 to pivot the object 24 from a first position into a second position, as best shown in FIG. 8.

The first position of the object 24 may be such that a longitudinal axis of the object 24 is parallel to a direction of travel of the object 24 (as shown in FIG. 8), while the second position may be such that the longitudinal axis is perpendicular to the direction of travel (not shown). The positioning wheel 104 may be secured to the object feed segment 100 of the object receiver 22 by standard brackets 114A, 114B known in the art. The positioning wheel raising and lowering means 108 may selectively return the positioning wheel 104 to a position below the plane defined by the top surfaces of the rollers 106 to thereby stop pivoting the objects 24 as they move across the object transfer segment 100 of the object receiver 22. The positioning wheel raising and lowering means 108 may be any mechanism known in the art that can achieve the described function of selectively raising and lowering the object positioning wheel above and below the plane defined by the top surface of the rollers 106, such as an electro-mechanical solenoid, a mechanical screw, a cam and lever, hydraulic piston, etc.

The object transfer segment 100 of the object receiver 22 may also include adjustable object guide rails 115A, 115B (shown best in FIGS. 1 and 8) adjacent and extending above sides of the object transfer segment 100, and positioned upstream of the object positioning wheel 104 (where "upstream" means prior to the objects contacting the object positioning wheel 104 with respect to the direction of travel of the objects 24 approaching the object positioning wheel 104). As shown best in FIG. 8 with respect to guide rail 115B, the adjustable guide rails 115A, 115B are configured with narrowing entries to effectively guide the objects 24 as they pass along the object transfer segment 100 toward the object positioning wheel 104 so that the first off-center sides 110 of the objects 24 are properly positioned to contact the object wheel 104 for effecting the described selective re-positioning of the objects 24.

The object positioning wheel 104 thereby permits the palletizing machine 10 to alternate alignment of, for example, the illustrated rectangular box-shaped objects 24 so that layers 116, 118 (shown in FIG. 1) or portions of layers of the boxes 24 positioned upon the pallet 18 may be in alternate, interlocking alignments to facilitate securing stacks of the layers upon the pallet 18 from tumbling off of the pallet 18. This alternate, interlocking alignment of adjacent layers is illustrated in FIG. 1 showing a first layer 116 under a second layer 118, wherein the alignment of the boxes 24 on the adjacent second layer 118 is not in parallel alignment, but is rather in alternate, interlocking alignment. Selectively raising and lowering the object positioning wheel 104 as the objects 24 move along the object feed segment 100 of the object receiver 22 accomplishes this task with extraordinary efficiency compared to known methods and mechanisms that accomplish a similar task.

The present invention also includes an improved object transfer segment 100, secured to a conveyor 119, such as a roller conveyor or belt conveyor for moving the objects 24, including the object positioning wheel 104 positioned as described above with respect to the transfer segment 100, but without the palletizing machine 10. The improved object transfer segment 100 of a roller conveyor 119 or other conveyor with the object positioning wheel 104 and possibly also with the described guide rails 115A, 115B may therefore be utilized in any object transfer system to selectively align objects 24 for purposes of transfer into alternative palletizing machines (not shown), or for simply changing the positioning of objects 24 moving along a transfer segment 100 for any reasons wherein it is desired to selectively change the alignment of objects 24 moving along the transfer segment 100 through use of the described object positioning wheel 104 within the transfer segment 100.

While the present invention has been disclosed with respect to the described and illustrated embodiments, it is to be understood that the invention is not to be limited to those embodiments. Accordingly, reference should be made primarily to the following claims rather than the foregoing description to determine the scope of the invention.

What is claimed is:

1. A palletizing machine (10) for positioning objects (24) onto a pallet (18), the machine (10) comprising:
   a. a frame (12) having a pallet plate (16) secured between posts (14A, 14B, 14C, 14D) of the frame (12) for supporting the pallet (18), the frame including raising and lowering means (20) for selectively raising and lowering the pallet (18) within the frame (12);
   b. an object receiver (22) secured to the frame for receiving objects (24);
   c. a pusher bar assembly (26) secured to the frame (12) adjacent the object receiver (22), the pusher bar assembly (26) including;
      i. a pusher bar (28) for pushing objects (24) from the object receiver (22) onto the pallet (18) supported by the pallet plate (16);
      ii. at least one first pusher strut (30) secured between a first end (31) of the pusher bar (28) and a pusher bar drive means (32) secured to the frame (12) for moving the pusher bar (28) from adjacent the object receiver (22) over the pallet plate (16) and back to adjacent the object receiver (22); and,
      iii. at least one raised return rail (44) secured to the frame (12) adjacent the object receiver (22) and configured so that the pusher bar (28) passes under the at least one raised return rail (44) as the pusher drive means (32) moves the pusher bar (28) and objects (24) contacting the pusher bar (28) from adjacent the object receiver (22) over the pallet plate (16), and so that the pusher bar (28) passes along the at least one raised return rail (44) as the pusher drive means (32) moves the pusher bar (28) from over the pallet plate (16) back to adjacent the object receiver (22); and,
      iv. wherein the at least one raised return rail (44) includes an override segment (56) upon which the pusher bar (28) passes, and an override segment distance (60) defined between the override segment (56) and the object receiver (22) being sufficient to permit the pusher bar (28) to pass over the objects (24) upon the object receiver (22) as the pusher bar (28) is returned by the pusher drive means (32) to adjacent the object receiver (22); and,
   d. a stripper sheet positioning assembly means (80) for selectively passing a stripper sheet (82) parallel to a plane defined by the pallet (18) adjacent the object receiver (22) for facilitating sliding of objects (24) over the pallet plate (16), the stripper sheet positioning means (80) including;

i. a first dead weight (86) extending between the frame posts (14D, 14A);

ii. a second dead weight (90) extending between the frame posts (14C, 14D);

iii. a stripper sheet drive axle (92) extending between the frame posts (14D, 14A) adjacent the object receiver (22);

iv. the stripper sheet (82) being secured between the first and second dead weights (86, 90); and, v. a stripper sheet drive means (96) secured to the stripper sheet drive axle (92) for selectively positioning the stripper sheet (82) between a first position parallel to a plane defined by the pallet plate (16) and a second position away from the first position.

2. The palletizing machine of claim 1, wherein the object receiver (22) further comprises;

a. an object transfer segment (100) and an adjacent pallet feed segment (102) wherein the pusher bar (28) is adjacent the pallet feed segment (102) for pushing objects from the pallet feed segment (102) onto the pallet (18);

b. an object positioning wheel (104) secured between rollers (106) of the object receiver (22) within the object transfer segment (100) so that the positioning wheel (104) is positioned on either side of a roller (106) midline defined to run parallel to an axis of travel of the objects (24) upon the object transfer segment (100) of the object receiver (22) and mid-way between opposed sides of the object transfer segment (100) of the object receiver (22), the object positioning wheel (104) including positioning wheel raising and lowering means (108) to selectively raise and lower the wheel (104) above and below a plane defined by top surfaces of the rollers (106), the wheel (104) configured to contact a side of an object (24) traveling along the object receiver (22) to interrupt travel of a side of the object (24) contacting the object positioning wheel (104) so an opposed side of the object (24) continues along the rollers (106) of the object transfer segment (100) to pivot the object (24) from a first position into a second position.

3. The palletizing machine (10) of claim 2, wherein the object transfer segment (100) further comprises adjustable object guide rails (115A, 115B) secured adjacent and extending above sides of the object transfer segment (100), and positioned upstream of the object positioning wheel (104), the adjustable guide rails (115A, 115E) being configured with narrowing entries to guide the objects (24) passing along the object transfer segment (100) toward the object positioning wheel (104) so that the first off-center side (110) of the objects (24) are positioned to contact the object wheel (104).

4. The palletizing machine of claim 1 wherein the at least one raised return rail (44) includes a one-way strut guide means (50) for guiding the pusher strut (30) to ride along the rail (44) as the strut (30) moves toward the object receiver (22), and rides under the rail (44) as the strut (30) moves away from the object receiver (22).

5. The palletizing machine of claim 1, wherein the raised return rail (44) defines a first raised return rail entry (62) secured adjacent the object receiver (22), wherein an entry distance (66) between the raised return rail entry (62) and the object receiver (22) is sufficient to permit the pusher bar (28) to move along the object receiver (22) unimpeded by the entry (62).

6. A palletizing machine (10) for positioning objects (24) onto a pallet (18), the machine (10) comprising:

a. a frame (12) having a pallet plate (16) secured between posts (14A, 14, 14C, 14D) of the frame (12) for supporting the pallet (18), the frame including raising and lowering means (20) for selectively raising and lowering the pallet (18) within the frame (12);

b. an object receiver (22) secured to the frame for receiving objects (22);

c. a stripper sheet positioning assembly means (80) for selectively passing a stripper sheet (82) parallel to a plane defined by the pallet (18) adjacent the object receiver (22) for facilitating sliding of objects (24) over the pallet plate (16), the stripper sheet positioning assembly positioning means (80) including;

i. a first dead weight (86) extending between the frame posts (14D, 14A)

ii. a second dead weight (90) extending between the frame posts (14C, 140);

iii. a stripper sheet drive axle (92) extending between the frame posts (14D, 14A) adjacent the object receiver (22);

iv. the stripper sheet (82) being secured between the first and second dead weights (86, 90); and, v. a stripper sheet drive means (96) secured to the stripper sheet drive axle (92) for selectively positioning the stripper sheet (82) between a first position parallel to a plane defined by the pallet plate (16) and a second position away from the first Position.

7. The palletizing machine of claim 6, wherein the object receiver (22) further comprises;

a. an object transfer segment (100) and an adjacent pallet feed segment (102) wherein a pusher bar (28) is adjacent the pallet feed segment (102) for pushing objects from the pallet feed segment (102) onto the pallet (18);

b. an object positioning wheel (104) secured between rollers (106) of the object receiver (22) within the object transfer segment (100) so that the positioning wheel (104) is positioned on either side of a roller (106) midline defined to run parallel to an axis of travel of the objects (24) upon the object transfer segment (100) of the object receiver (22) and mid-way between opposed sides of the object transfer segment (100) of the object receiver (22), the object positioning wheel (104) including positioning wheel raising and lowering means (108) to selectively raise and lower the wheel (104) above and below a plane defined by top surfaces of the rollers (106), the wheel (104) configured to contact a side of an object (24) traveling along the object receiver (22) to interrupt travel of a side of the object (24) contacting the object positioning wheel (104) so an opposed side of the object (24) continues along the rollers (106) of the object transfer segment (100) to pivot the object (24) from a first position into a second position.

8. The palletizing machine (10) of claim 7, wherein the object transfer segment (100) further comprises adjustable object guide rails (115A, 115B) secured adjacent and extending above sides of the object transfer segment (100), and positioned upstream of the object positioning wheel (104), the adjustable guide rails (115A, 115B) being configured with narrowing entries to guide the objects (24) passing along the object transfer segment (100) toward the object positioning wheel (104) so that the first off-center side (110) of the objects (24) are positioned to contact the object wheel (104).

* * * * *